United States Patent [19]

Clément et al.

[11] 4,364,877

[45] Dec. 21, 1982

[54] PROCESS FOR PRODUCING FRITTED ALUMINA MEMBERS

[75] Inventors: René Clément; Francis Gugliermotte, both of Castries, France

[73] Assignee: Societe Europeenne des Ceramiques A lumineuses "EUROCERAL", Vendargues, France

[21] Appl. No.: 228,896

[22] Filed: Jan. 27, 1981

[30] Foreign Application Priority Data

Feb. 8, 1980 [FR] France .............................. 80 02787

[51] Int. Cl.³ ............................................. C04B 35/44
[52] U.S. Cl. ..................................... 264/1.2; 264/63; 264/65; 264/66
[58] Field of Search ....................... 264/1.2, 63, 65, 66

[56] References Cited

U.S. PATENT DOCUMENTS

| 3,026,210 | 3/1962 | Coble | 264/1.2 |
| 3,206,177 | 3/1962 | St. Pierre | 264/65 |
| 3,875,277 | 4/1975 | Bratton | 264/1.2 |

FOREIGN PATENT DOCUMENTS

| 2288958 | 6/1976 | France . |
| 2317067 | 2/1977 | France . |

OTHER PUBLICATIONS

Harmer et al., "Rapid Sintering of Pure and Doped $\alpha$-Al$_2$O$_3$", *Trans. Brit. Cer. Soc.*, vol. 78, No. 1, 1979, pp. 22–25.

G. C. Kuczynski, "Sintering and Related Phenomena", *Materials Science Research*, No. 6, 1973, p. 217.

J. G. J. Pee Len, "Transparent Hot Pressed Alumina", *Ceramurgia International*, vol. 5, No. 3, 1979, pp. 70–73.

*Primary Examiner*—John A. Parrish
*Attorney, Agent, or Firm*—Pearne, Gordon, Sessions, McCoy & Granger

[57] ABSTRACT

A process for producing fritted alumina members having a high optical transparency and a high mechanical strength of the type involving the production of the members from a high purity alumina powder to which has been added an organic binder and a small percentage of oxide, particularly of magnesium and/or rare earth, followed by the shaping thereof and subjecting them to two successive heat treatments, namely a first treatment in an oxidizing atmosphere to remove the binder and consolidate the particles and a second treatment at a higher temperature and in a hydrogen-rich atmosphere for obtaining fritting, wherein the second heat treatment takes place by continuously passing the said members through a kiln kept at a temperature between 1820° and 1970° C. at a constant translation speed between 3 and 50 millimeters per minute, the total time necessary for firing a member from the consolidated or slightly warm state up till its return to ambient temperature varying from approximately 30 minutes to a maximum of 5 hours.

7 Claims, 1 Drawing Figure

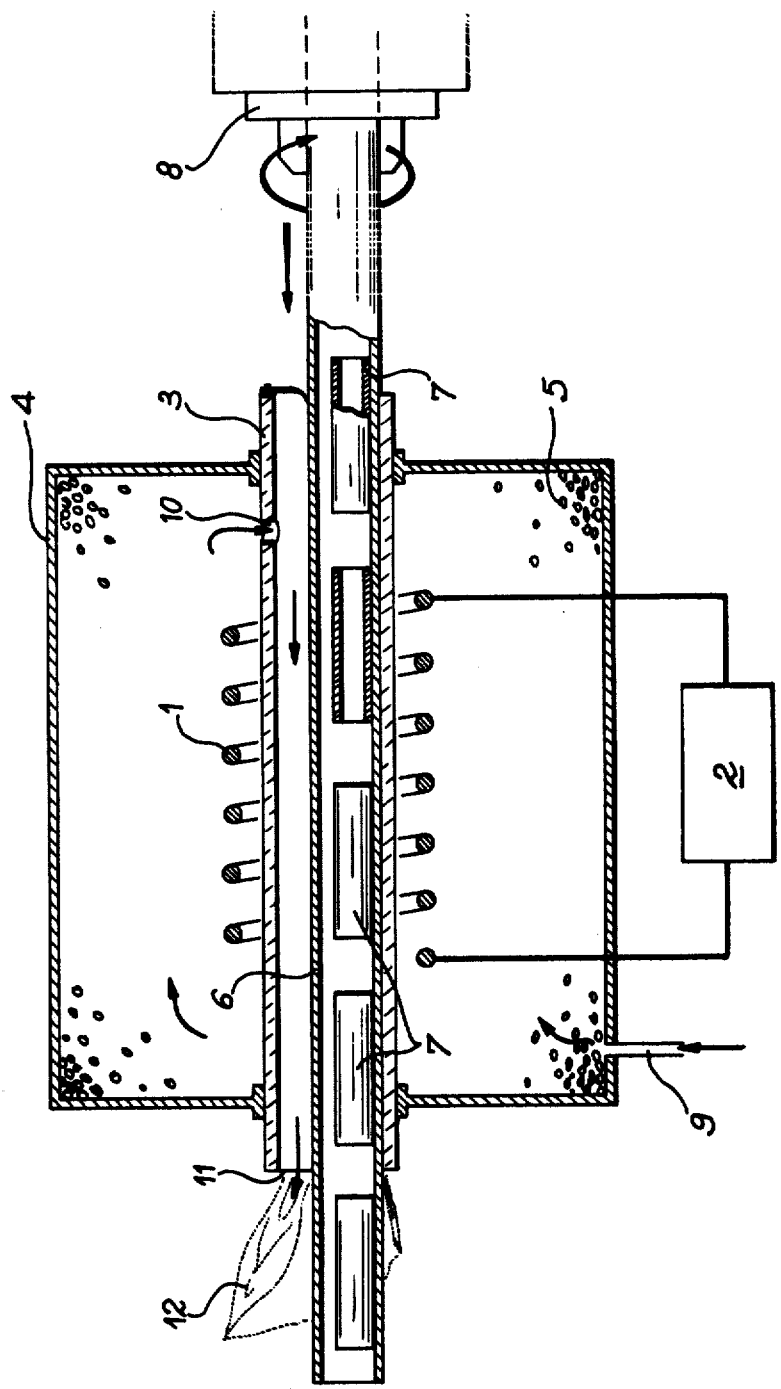

PROCESS FOR PRODUCING FRITTED ALUMINA MEMBERS

The present invention relates to members and particularly to translucent alumina tubes and specifically to such tubes used in high pressure metal vapour lamps.

High pressure metal vapour lamps, such as discharge lamps in a sodium vapour are undergoing considerable development due to their very high light output and their very long service life.

The jacket of such lamps must be optically transparent, resist high temperatures and the corrosive action of metal vapours under high pressure and must be very strong from the mechanical standpoint in order to withstand operating stresses as well as those resulting from the application of metal seals for fixing the electrodes. As a result, this jacket is conventionally made from high density pure alumina.

Therefore, every effort is made to produce a material whose crystals have a maximum regularity of size, whilst eliminating all impurities and all pores between and in the crystals in order that there is a maximum light transmission.

As the mechanical strength increases in inverse proportion with the size of the alumina crystals and as the optical transparency increases with the size of the crystals, it is therefore necessary to seek optimum conditions making it possible to obtain crystals which are sufficiently large to provide a good light transmission and sufficiently small to ensure high mechanical strength.

The main parameters making it possible to achieve this objective are as follows:
  the chemical and physical nature of the alumina powder which must be very pure and have a grain size distribution which is as centered as possible;
  the shaping process which must lead to a maximum crude density and in particular;
  the fritting conditions, which must permit the densification of the material, i.e. the regular and limited growth of the crystals and complete elimination of pores.

The material obtained must be optically transparent, i.e. the total light transmission value controlled by the integrated sphere method as described, for example, in the article by A. H. TAYLOR "Theory, construction and use of photometric integrating sphere" (Sci Paper No. 447, Bull Bur, Stand, Sept. 26th 1921) must be a minimum of 90% for a 0.7 mm thick tube.

It should be noted that this translucent alumina differs very greatly from ordinary "fritted alumina", whose density is only close to the theoretical density of alumina and which is opaque, whilst translucent alumina is pure and has the said theoretical density.

Ordinary fritted alumina is in fact a ceramic which, as has been known for many decades, can be obtained with more or less pure aluminas and widely varying grain sizes, with numerous additives and various heat treatments, including rapid fritting with an extremely short thermal cycle.

However, this material is not translucent because it contains impurities and pores in and between the crystals. Moreover, its mechanical strength is relatively low because the crystals have widely varying sizes and it is unable to withstand a high temperature corrosive atmosphere due to the impurities present.

For the expert, there is a considerable technical difference between these opaque dense aluminas and translucent alumina which is constituted, as stated hereinbefore, by crystals of regular size, which are free from impurities except for the addition of a small proportion of an oxide selected so as to prevent the growth of grains and whose pores, both between and in the grains, have been eliminated by a very special heat treatment.

The practical feasibility of producing translucent alumina was not discovered until 1962 when the Coble U.S. Pat. No. 3,026,210 was filed. Since then, improvements have been made in the production of this material relating mainly to the increase in the optical transparency by modifying the additives, but no decisive advance has been made in the heat treatment. The latter must be carried out in vacuo or under hydrogen and theoretically over a very long period considered necessary to ensure a homogeneous crystallization of the alumina and particularly for eliminating all the pores at the grain size joints and whose displacement speeds, according to theoretical calculations, were extremely slow.

These prolonged fritting times can be gathered from numerous publications, including:
  the article by G. C. KUCZYNSKI "Sintering and related phenomena" in Materials Science Research, No. 6, 1973, p. 217;
  U.S. Pat. No. 3,026,210, referred to hereinbefore, whose examples refer to a temperature of 1900° C. maintained for 1000 minutes;
  The more recent U.S. Pat. No. 3,792,142, all of whose examples refer to periods of 5 hours;
  the article by J. G. J. PEE LEN "Transparent hot pressed alumina" Ceramurgia International, Vol. 5, No. 3, 1979, pp. 70–73 recommending fritting periods of 10 and 24 hours at 1800° and 1850° C. respectively.

These prolonged fritting methods must necessarily be performed in fixed kilns or furnaces. Heat treatments performed in fixed kilns or furnaces over long periods have numerous technical, economic and industrial disadvantages.

From the technical standpoint, these large kilns, which must have relatively large dimensions, in order to permit the firing of an adequate number of tubes, are equipped with numerous heating resistors in order to ensure an optimum uniform temperature. However, despite costly and sensitive heating and regulating systems, the temperature is not strictly the same at all points in the kiln and there are variations in the tube characteristics. The reproducibility of characteristics in the same kiln and between individual kilns is the most serious problem to be solved in the case of heat treatments over a long period in a fixed kiln. Moreover, there is considerable evaporation of the magnesia during prolonged high temperature firing under hydrogen or in vacuo and the quantity left behind becomes inadequate to prevent an exaggerated development of crystals, whose size becomes too large and the tubes then completely lose their mechanical strength. It is then necessary to add a great deal of magnesia at the outset, because it is not known what amount will be left behind after the heat treatment.

Moreover, the impurities contained in the starting substances, evaporate, condense in the coldest parts of the fixed kiln and disturb the subsequent fritting operations of the tubes.

Finally, the tubes must be separated by inserted molybdenum or alumina members in order to prevent sticking between them during prolonged heat treatments. For all these reasons, this discontinuous firing method is extremely onerous, particularly in view of the fact that industrial production requires a large number of intermittent kilns and a relatively large labour force for the charging and discharging operations.

The present invention relates to a process making it possible to produce translucent polycrystalline alumina tubes having an excellent optical transparency and a very high mechanical strength, particularly a very high resistance to thermal shocks, by means of a final heat treatment performed in accordance with a much more rapid cycle than those of the prior art processes.

The present invention therefore relates to a process for producing fritted alumina members having a high optical transparency and a high mechanical strength of the type involving the production of the members from a high purity alumina powder to which has been added an organic binder and a small percentage of oxide, particularly of magnesium and/or rare earth, followed by the shaping thereof and subjecting them to two successive heat treatments, namely a first treatment in an oxidizing atmosphere to remove the binder and consolidate the particles and a second treatment at a higher temperature and in a hydrogen-rich atmosphere for obtaining fritting, wherein the second heat treatment takes place by continuously passing the said members through a kiln kept at a temperature between 1820° and 1970° C. at a constant translation speed between 3 and 50 millimeters per minute, the total time necessary for firing a member from the consolidated or slightly warm state up till its return to ambient temperature varying from approximately 30 minutes to a maximum of 5 hours.

The originality of the process according to the invention is consequently based on the way in which the second heat treatment is performed, because the applicant has in fact found that in an unexpected manner and contrary to what was stated in a large number of earlier publications, a long duration heat cycle involving a very slow temperature rise, a period of several hours at optimum temperature and then a very slow return to ambient temperature is not indispensible for giving pure alumina tubes the requisite physical qualities. Research carried out on this subject has shown that a very rapid heat cycle performed in strictly controlled manner can lead to the construction of tubes having an even higher optical transparency and mechanical strength than in the case of a very long-term firing, whilst using optimum technical, industrial and economic conditions.

According to an important feature of the process, the members and particularly tubes can be displaced in the fritting kiln or furnace in two different ways.

According to a first embodiment, the members in the form of tubes are regularly displaced in the longitudinal direction with respect to the heat gradient, so that at any instant only a short portion of the material is at firing temperature from one to the other end of the member.

According to a second embodiment, the members in the form of tubes are regularly displaced in the transverse direction with respect to the heat gradient, each member being completely raised to an increasing and then a decreasing temperature.

According to the furnace, during the passage of the members, the kiln is exposed to a circulation of pure hydrogen or hydrogen to which has been added small quantities of oxygen and/or carbon monoxide and/or nitrogen and/or water vapour.

The effectiveness of the process according to the invention makes it possible to more easily determine the necessary quantities of oxide of magnesium and/or rare earths added to the pure alumina powder before treatment takes place. In general, a quantity of approximately 0.05% is adequate.

The first heat treatment or preliminary treatment for the elimination of the organic binder can, as in the prior art, take place in an oxidizing atmosphere, generally air, at a temperature above 700° C.

This rapid fritting process using firing kilns or chambers in which the tubes move relative to a fixed hot zone either in the longitudinal direction, the heat treatment being performed progressively from one end to the other of the tubes, or in the transverse direction, the complete tube being exposed to the same temperature which increases regularly, makes it possible to produce tubes formed from relatively small size alumina crystals giving them an excellent resistance to thermal shocks, as well as a very considerable optical transparency.

The physical characteristics are industrially reproduced with very considerable accuracy, because the tubes undergo precisely the same heat treatment. This precision and accuracy is also encountered with regard to the geometry and the dimensions can be defined with a very limited tolerance. This reproducibility of the characteristics is also due to the fact that during these very short cycle heat treatments, the oxide added to prevent an exaggerated growth of the crystal size, particularly the magnesia crystals, virtually undergoes no evaporation and it is then possible to introduce very limited quantities thereof, which is advantageous from the optical transparency standpoint.

Moreover, the impurities evaporate in the hottest zone and condense in the cold parts of the chamber or even outside the latter and have no effect on the structure of the tubes and do not cause local chemical heterogeneities which could be prejudicial to the optical qualities.

The speed at which the members or tubes advance in the kilns leads to a total fritting time (as from the introduction of a cold member at the tube entrance to the recovery of the fritted member and the return to ambient temperature) which can vary between approximately 30 minutes and a maximum of 5 hours. This constitutes a considerable advance compared with the prior art, particularly if account is also taken of the fact that the process takes place continuously.

According to a final object of the invention, the fritting kilns or chambers are constituted either by a tubular enclosure heated very locally by means of an electrical resistor and in which the tubes advance longitudinally at a regular speed with, optionally, a rotary movement on themselves, or a parallelepipedic enclosure having the length of the tubes and whose height exceeds their diameter, heated locally by means of an electrical resistor and in which the tubes advance transversely, their displacement being ensured by gravity if the enclosure is inclined or by a mechanical pusher system if the enclosure is horizontal.

BRIEF DESCRIPTION OF THE DRAWING

The features and advantages of the invention will become more apparent from the following description of a non-limited embodiment, with reference to the attached drawing, which is a longitudinal section through a chamber and pusher system for carrying out the rapid cycle heat treatment for the production of translucent alumina tubes according to the process of the invention.

EXEMPLIFIED EMBODIMENT 100 kg of an alumina powder having a high proportion of alumina α, with a specific surface area of approximately 15 m²/g are mixed with 0.05% of magnesium oxide (or equivalent proportion of magnesium aluminate or spinel), then with 0.3 kg of ethyl methyl cellulose in powder form and 4 kg of water in order to form the organic binder. The added oxide quantity can vary, according to the invention, from 0.01 to 0.1% by weight.

This mixture is stirred for a long time until a paste with a homogeneous consistency is obtained in a mixer, e.g. of the Simpson type with grinding wheels which crush the product. The thus obtained paste is forced by means of a plunger press through a nozzle having holes with a diameter of 2 mm. This operation is repeated three times in order to ensure the complete homogeneity of the mixture.

The resulting paste is brought into the shape of tubes by forcing it under pressure into an annular space made between a nozzle and a punch or die.

The tubes obtained are slowly dried in air and then in an oven at 80° C. The tubes are then cut to the final length (taking account of the shrinkage which they undergo during the various heat treatments) and then undergo a first heat treatment in air at 1100° C. for 1 hour. This first firing serves to remove the organic binders and to consolidate the pulverulent material.

The final treatment or second heat treatment forming the object of the invention can be performed in a fritting chamber, like that shown on the attached drawing. An electrical resistor 1 made from molybdenum energised by a regulated circuit 2 surrounds a pure alumina refractory tube 3 located in a metal box 4, filled with refractory insulant 5 (brick, fibres or balls).

A pure alumina tube 6 containing the members 7 to be heat treated rests by its lower generatrix on the inner wall of tube 3 and is slowly advanced at a rate of 1 cm/min, whilst rotating upon itself by ⅓ r.p.m. by means of pusher system 8.

The electrical resistor 1 is regulated in such a way that the maximum temperature within tube 3 is 1930° C.

The tube 7 to be fired then travels regularly within the kiln and from one end to the other is exposed to the said temperature.

Throughout the treatment period, a hydrogen-rich gas is passed into box 4 to protect resistor 1 from oxidation. It enters box 4 via pipe 9 and from there passes into tube 3 by orifice 10 provided for this purpose in the wall of tube 3.

As the moving tube 6 is very porous at this temperature, the hydrogen-rich gas easily traverses the wall of said tube 6 and consequently immerses the members 7 to be treated.

Finally, the gas escapes at the end 11 of the tube 3, where it burns in air forming a flame 12.

The total length of the fritting chamber is 85 cm, so that the complete tube firing cycle takes 1½ hours.

The thus produced tubes are checked by the integrating sphere method as described, for example, in the article by E. B. ROSA and A. H. TAYLOR "Theory, construction and use of the photometric intergrating sphere", Sci. Paper No. 447, Bull Bur. Stand, Sept. 26th 1921.

In the case of tubes produced in accordance with the aforementioned exemplified embodiment, the total transmission values are 96%.

The fritting chamber described is an example of the kiln for the heat treatment of translucent alumina tubes constructed according to the process of the invention which is of particularly simple design, has an economic construction and operation, whilst having limited overall dimensions. However, it is obvious that other types of kilns or fritting chambers operating on a rapid cycle basis can be used without passing beyond the scope of the invention.

We claim:

1. A process for producing fritted alumina members having a high optical transparency and a high mechanical strength from a high purity alumina powder to which has been added an organic binder and a small percentage of oxide, particularly of magnesium and/or rare earth, followed by the shaping thereof and subjecting them to two successive heat treatments, namely a first treatment in an oxidizing atmosphere to remove the binder and consolidate the particles and a second treatment at a higher temperature and in a hydrogen-rich atmosphere for obtaining fritting, wherein the second heat treatment takes place by continuously passing the said members at a constant translation speed between 3 and 50 millimeters per minute through a kiln kept at a temperature between 1820° and 1970° C. and having a heat gradient therein, the total time necessary for firing a member from the consolidated or slightly warm state up till its return to ambient temperature varying from approximately 30 minutes to a maximum of 5 hours.

2. A process according to claim 1, wherein the members in the form of tubes are regularly displaced in the longitudinal direction with respect to the heat gradient, so that at any instant only a short portion of the material is at firing temperature from one to the other end of the member.

3. A process according to claim 1, wherein the members in the form of tubes are regularly displaced in the transverse direction with respect to the heat gradient, each member being completely raised to an increasing and then a decreasing temperature.

4. A process according to any one of the claims 1 to 3, wherein the kiln is exposed to a circulation of pure hydrogen during the passage of the members.

5. A process according to claim 4, wherein the kiln is exposed to a circulation of hydrogen to which are added small quantities of oxygen and/or carbon monoxide and/or nitrogen and/or water vapour during the passage of the members.

6. A process according to claim 4, wherein the oxide of magnesium and/or rare earth added to the pure alumina powder is in a proportion between 0.01 and 0.1% by weight.

7. A process according to claim 1, wherein said kiln includes a localized heat source and said second heat treatment includes maintaining said localized heat source at said temperature to provide said heat gradient.

* * * * *